Figure 1:
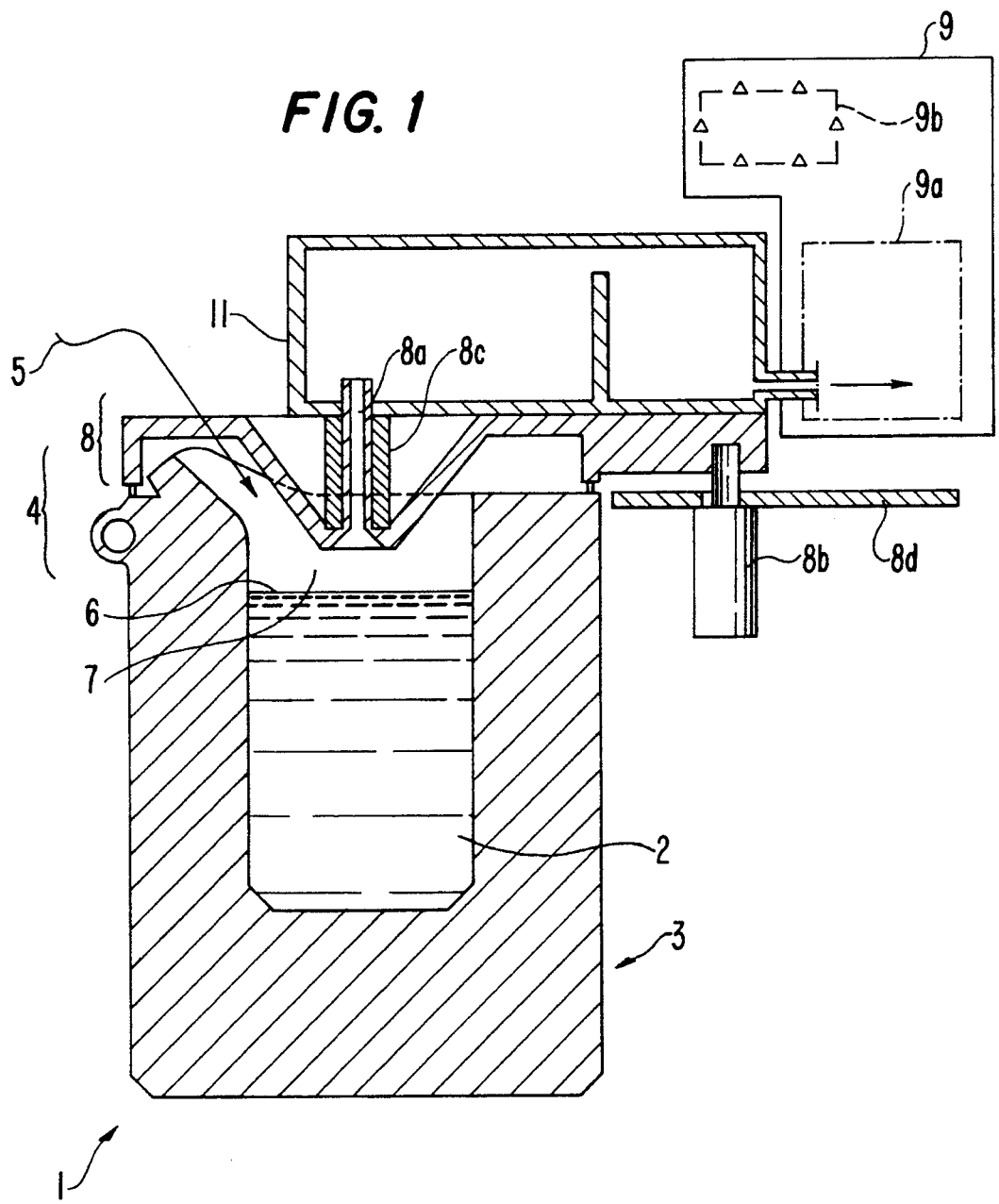

United States Patent [19]

Tissier et al.

[11] Patent Number: 5,387,275
[45] Date of Patent: Feb. 7, 1995

[54] PROCESS FOR EXTRACTING ZINC PRESENT IN LIQUID CAST IRON, MEANS FOR THE IMPLEMENTATION OF THE PROCESS, AND PRODUCTS THUS OBTAINED

[75] Inventors: Jean C. Tissier; Jean Y. Dauphin, both of Fretin; Pierre Perrot, Roubaix Cedex, all of France

[73] Assignee: Ecole Centrale de Lille, Villeneuve d'Ascq, France

[21] Appl. No.: 39,006

[22] PCT Filed: Oct. 3, 1991

[86] PCT No.: PCT/FR91/00776
§ 371 Date: Sep. 17, 1993
§ 102(e) Date: Sep. 17, 1993

[87] PCT Pub. No.: WO92/06222
PCT Pub. Date: Apr. 16, 1992

[30] Foreign Application Priority Data
Oct. 9, 1990 [FR] France .................. 90 12651

[51] Int. Cl.⁶ .................. C21C 1/04; C22B 9/04
[52] U.S. Cl. ........................ 75/508; 75/658; 75/663
[58] Field of Search .......... 75/508, 658, 663–667; 266/208

[56] References Cited

U.S. PATENT DOCUMENTS
2,721,813  10/1955  Holmberg ................ 75/655

FOREIGN PATENT DOCUMENTS
1251328  3/1989  Canada .
2021155  11/1979  United Kingdom .

OTHER PUBLICATIONS

*Patent Abstracts of Japan,* vol. 10, No. 350 (C-387) (2406) (Nov. 26, 1986) as it relates to JP-A-61-149415 (Sumitomo) (Jul. 8, 1986).
*Patent Abstracts of Japan,* vol. 8, No. 3 (C-203) (1440) (Jan. 7, 1984) as it relates to JP-A-58-171,519 (Kubota) (Oct. 8, 1983).

*Primary Examiner*—Peter D. Rosenberg
*Attorney, Agent, or Firm*—Kerkham, Stowell, Kondracki & Clarke

[57] ABSTRACT

The invention relates to the field of metallurgy and to a method and a device for the extraction of zinc in solution in a liquid iron bath (2) held in a container (3), such as a crucible for the casting of foundry parts. It is characterized in that, before utilizing the bath for the casting of parts, in a first phase, the gas volume (7) situated in the container (3) is sealingly confined in the east iron bath (2) and, in a second phase, a variable partial vacuum is created in the confined atmosphere in a controlled way in order to constantly adjust it to a predetermined value as a function of the time evolution of the pressure of vapor saturating zinc in solution in the melt at the bath temperature; and said zinc is trapped.

6 Claims, 2 Drawing Sheets

PROCESS FOR EXTRACTING ZINC PRESENT IN LIQUID CAST IRON, MEANS FOR THE IMPLEMENTATION OF THE PROCESS, AND PRODUCTS THUS OBTAINED

The invention pertains to a process for extracting zinc present in liquid cast iron.

The invention also pertains to the means for implementing the above-mentioned process and the products thus obtained.

More specifically, but not exclusively, the invention pertains to a process applicable to industrial settings and especially to a foundry.

Precisely, but not restrictively, the invention pertains to the elimination of zinc in the cast iron produced by melting salvaged ferrous materials.

The generalization of the process of galvanizing steel to protect it against corrosion has led to the increasingly frequent presence of zinc in salvaged scrap iron.

Said zinc, which is present in the cast iron produced from the above-mentioned type of scrap iron, involves problems, including the problem of inhibiting the action of magnesium used to ensure the formation of spheroidal graphite in said cast iron ("Effets du zinc introduit dans les charges en fonderie de fonte" [Effects of zinc added to batches in iron casting operations], S. Parent-Simonin, Fondeur d'Aujourd'hui No. 62, 1987).

It is known that the amount of zinc which can be present in solution in liquid cast iron cannot physically exceed a given level, which is a function of the temperature, pressure, and composition of the cast iron.

It is accepted that the maximum zinc content of conventional cast iron (liquid iron saturated with carbon) under an air pressure equal to a normal atmospheric pressure of 1 bar is 2.2% at 1,200° C.; 1.6% at 1,300° C.; 1.2% at 1,400° C.; and 0.9% at 1,500° C.

The contents found in practice are not as high as the maximum contents listed above.

Such contents are generally approximately 0.2% and only in rare cases exceed 0.4%, at least in 1990.

Zinc was still found to create problems, even when present in cast iron at a level of 0.1%, or 1,000 ppm.

The techniques now proposed to eliminate zinc consist, before melting, of either treating the scrap iron at a temperature higher than 910° C. in order to reach the boiling point of the zinc with a view to vaporizing it, or applying chemical treatment to scrap materials and dust using a reduction agent, then collecting the zinc.

The technique according to the invention aims to eliminate the zinc not from the scrap iron, but from the liquid cast iron, and the corresponding treatment can be applied either while the liquid cast iron is soaked in an induction furnace, or in a ladle located between the outlet of the furnace and the casting station.

The temperature of the liquid cast iron is conventionally between 1,100° C. and 1,600° C.

Of course, these are extreme values, because in practice we avoid dropping below 1,300° C. and heating above 1,500° C.

An average temperature of 1,400° C. is an effective compromise between the different limits.

The fraction of zinc dissolved in said liquid cast iron in excess of the maximum content progressively evaporates naturally, and with increasing speed the higher its initial concentration.

Therefore, it is the considerable portion of the zinc which naturally remains in solution in the liquid cast iron, thus referred to as "residual zinc," which the invention aims to eliminate completely, or at least to lower its concentration in the bath.

In order to extract zinc from cast iron, it is known (CA-A-1,251,328):

- In a first stage, with the cast iron being held in a container, to confine the volume of gaseous fluid located above the cast iron bath in a sealed manner;
- In a second stage, to place the confined atmosphere under a partial vacuum, the level of which can be varied in a controlled manner.

Said process has its advantages, but causes the cast iron to spatter, which is incompatible with its use in an industrial installation for casting parts in a plant.

Indeed, such cast iron spattering is highly damaging.

To that end the object of the invention is a process according to which, prior to the casting station, in order to trap the zinc:

- In a first stage, with the cast iron being held in a container, the gaseous volume located above the cast iron bath is confined in a sealed manner;
- In a second stage, the confined atmosphere is placed under a partial vacuum, the level of which is variable in a controlled manner.

This process is characterized in that the vacuum level can be adjusted constantly to a predetermined value as a function of the evolution over time of the saturating vapor pressure of the zinc in solution in the cast iron at the temperature of the bath, with said predetermined value being at least slightly higher than said saturating vapor pressure.

The invention also has as an object the means for the implementation of the process.

Figure 2:
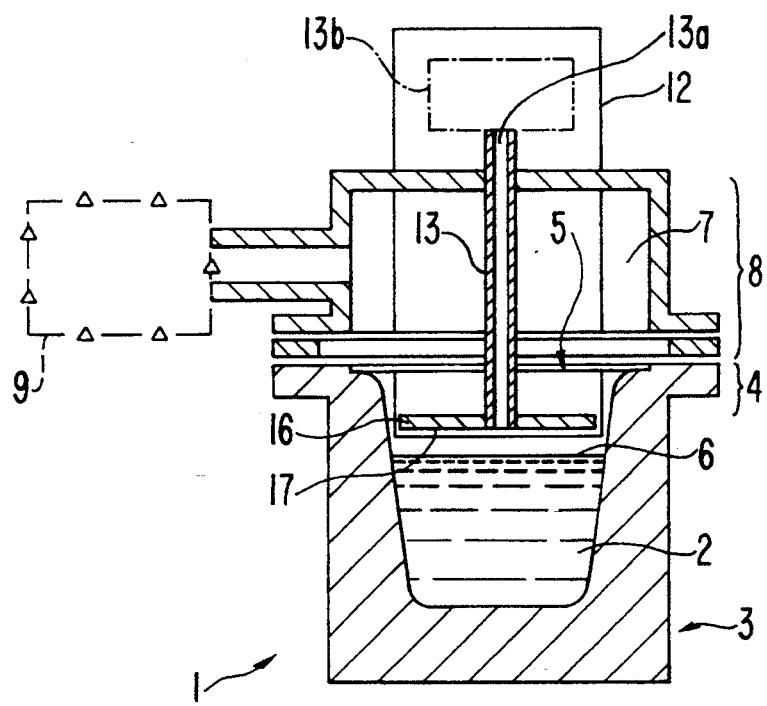
Figure 3:
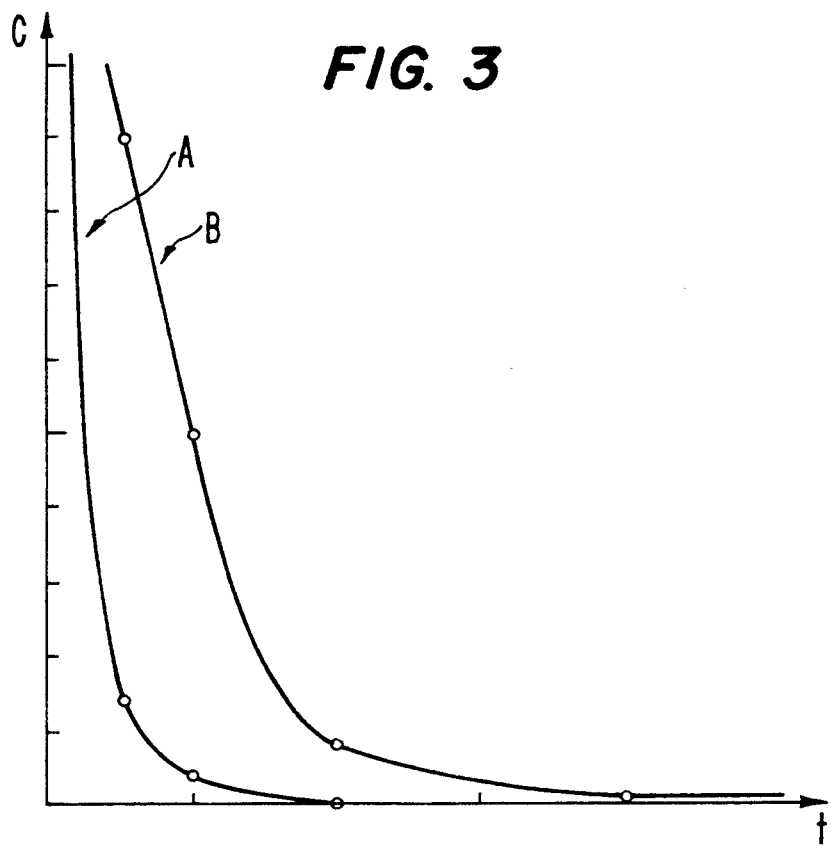

This invention will be clearly understood in reading the description below provided as a nonrestrictive example in relation to the accompanying drawing which schematically represents:

- FIG. 1: an installation for the implementation of the invention;
- FIG. 2: a varied embodiment of an installation for the implementation of the invention;
- FIG. 3: a graphic representing the evolution of the zinc concentration as a function of time.

In reference to the drawing, we see an installation 1 for melting cast iron 2 and/or soaking a cast iron bath held in a container 3 such as a crucible comprising in its upper part 4 an opening 5 for loading and/or casting the molten batch.

As can be envisaged, a volume 7 extends at least between the plane of opening 4 in the crucible and the plane which forms free surface 6 of the bath, and said volume is occupied by a gaseous fluid and therefore a gaseous atmosphere prevails therein, which communicates a given pressure to the bath through the intermediary of its free upper surface.

As is known, the propensity of a substance to evaporate from a liquid medium in which it is in solution at a given temperature depends on the saturating vapor pressure (vapor tension) of said substance at the temperature under consideration.

Similarly, it is known that the boiling temperature of a liquid under a given pressure is equal to the temperature at which its vapor tension is equal to the pressure under consideration.

Therefore, if at constant temperature the atmospheric pressure prevailing above the cast iron bath loaded with zinc is lowered, this tends first of all to induce the evaporation of the zinc.

The invention uses said phenomenon advantageously while correcting the problems which would occur if the pressure of the atmosphere located above the bath were not controlled.

Indeed, the excessive lowering of the gaseous pressure exerted on the upper surface of the bath would cause the zinc to vaporize suddenly, which would cause the liquid cast iron to spatter violently.

Considering the temperature of the liquid cast iron, it is therefore desirable to moderate the evaporation of the zinc.

To that end, before the bath is used for the casting of parts, for the purpose of trapping zinc:
- In a first stage, gaseous volume 7 located in container 3 above cast iron bath 2 is confined in a sealed manner;
- In a second stage, the confined atmosphere is placed under a partial vacuum, the level of which can be varied in a controlled manner.

In a remarkable manner, the vacuum level is adjusted constantly to a predetermined value as a function of the evolution over time of the saturating vapor pressure of the zinc in solution in the cast iron at the temperature of the bath, said predetermined value being at least slightly higher than said saturating vapor pressure.

In order to apply the partial vacuum:
- The gaseous fluid which forms the confined atmosphere is extracted in a controlled manner so as to lower the pressure of the confined atmosphere progressively during a predetermined period of time to a value which is also predetermined but which is higher than the saturating vapor pressure of the zinc in solution in the cast iron at the temperature of the bath; then
- Said pressure is maintained for a predetermined period of time.

Primarily when the zinc is being trapped far from the upper surface of the bath, the zinc vapors are prevented from condensing above the bath and falling back into the latter.

In accordance with the invention, in order to prevent the zinc vapors from condensing above the bath, they are extracted from the confined atmosphere above said bath, in suspension in the gaseous fluid which forms said atmosphere, and, while the gaseous fluid is being transported, it is reheated in order to prevent the zinc vapors from condensing.

For the trapping operation properly speaking, in an initial embodiment, the gaseous fluid extracted from the container is treated far away from the bath so as to condense the zinc vapors contained therein.

In a varied embodiment, the zinc is oxidized and to that end, while the gaseous fluid which forms the confined atmosphere is being extracted, a gaseous oxidizing fluid is injected into the container substantially at right angles with the surface of the cast iron bath, so as to cause said oxidation of the zinc as soon as the vapors leave said bath. A cleansing operation is subsequently used to extract the zinc oxide.

Furthermore, a mechanism 8 to confine the gaseous volume located in the container, over the bath, and a mechanism 9 to create a partial vacuum level in the atmosphere, which can be varied in a controlled manner, through the intermediary of a mechanism 9a to extract the gaseous fluid present in the confined volume, the means to implement the invention primarily comprise (FIG. 1):
- A mechanism 9b to control said extraction mechanism 9a to adjust the vacuum level to a predetermined value as a function of the evolution over time of the saturating vapor pressure of the zinc in solution in the cast iron at the temperature of the bath, said predetermined value being at least slightly higher than said saturating vapor pressure; and
- Mechanisms 11, 12 to trap the zinc.

Confinement mechanism 8 essentially comprises a cover fitted in a sealed manner over the opening of the container.

Fluid extraction mechanism 9a consists, for example, of a vacuum pump connected to an opening placed in the cover.

Mechanism 9b to control the extraction mechanism according to the predetermined rule consists, for example, of a programmable autolathe.

Mechanism 11, 12 intended to trap the zinc comprises a mechanism 8a to prevent the zinc vapors from condensing above the cast iron bath, such as a channel 8a which draws the gaseous fluid from above the bath and placed in cover 8, said channel 8a being endowed with a heating mechanism 8c designed to prevent the zinc from condensing at that point.

Preferably cover 8 is shaped so that channel 8a issues a few centimeters away from the free surface of the bath.

Cover 8 is advantageously supported by a jack 8b which itself is held by a frame 8d, and said jack upon opening makes it possible to raise the cover then to retract it laterally in respect of the container and vice versa upon closing.

For the trapping operation properly speaking, trapping mechanism 11, 12 consists, in an initial form 11 of embodiment, of a mechanism for condensing zinc vapors removed from over the bath.

For example, said condensation mechanism 11 consists of Raschig rings cooled with water.

In a varied embodiment (FIG. 2), trapping mechanism 11, 12 consists of a mechanism 12 to oxidize the zinc, such as a mechanism for the controlled introduction of a gaseous oxidizing fluid at right angles with surface 6 of the cast iron bath.

The intake of the gaseous oxidizing fluid such as air into the confined volume itself is then regulated and taken into account in order to determine the partial vacuum.

In said variation, mechanism 12 intended to cause the zinc vapors to condense above the bath comprises on the one hand a rigid plate 16 endowed with a substantially flat surface 17 which is approximately the same size as the surface of the bath and, on the other hand, a component 13 to hold said plate both a short distance above the surface of the bath and at a temperature higher than the vaporization temperature of the zinc under the controlled pressure.

In a preferred embodiment, on the one hand, the gaseous fluid is injected through plate 16 toward the surface of the bath by a mechanism 13b for that purpose through the intermediary of conduit 13a, said conduit preferably being composed of component 13 which holds the rigid plate at the required distance and, on the other hand, the rigid plate consists of a disk made of refractory material.

In FIG. 3, curve A reflects the kinetics of zinc elimination at 1,380° C. under 120 millibar (12 kilopascal), while Curve B in the same figure shows the kinetics of zinc elimination at 1,380° C. under 500 millibar (50 kilopascal).

In FIG. 3, time t is shown on the abscissa, while concentrations C are placed on the ordinate.

Time zero is the instant at which the operating pressure is reached in the confinement chamber.

For example, for a bath having a mass of 50 grams, after a pressure of 12 kilopascal is maintained for 16 seconds, we obtain a ratio between the mass of zinc over total mass of 0.014% (and of 0.004% for a holding time of 30 seconds).

Under a pressure of 50 kilopascal, the mass ratio in percent is only 0.051 after a holding time of 30 seconds.

The process according to the invention must make it possible to lower the concentration of zinc below the ppm level.

In practice, analyses show that it is easy to drop below the detection threshold of the spark spectrometers currently in use, or 10 ppm, while, from a metallurgical point of view, a residual content of 50 ppm already seems to represent a totally acceptable limit.

What is claimed is:

1. Process for extracting zinc in solution in a liquid cast iron bath containing zinc (2) held in a container (3) for the casting of foundry parts;

said container also holds, above free surface (6) of the cast iron bath which is at a specific temperature, a gaseous volume (7) which communicates to said bath through the intermediary of the above-mentioned free surface, a pressure which is also specific and primarily atmospheric pressure, with the zinc in solution having a given vapor pressure at said temperature;

said process comprising before the bath is used for the casting of parts:

- in a first stage, gaseous volume (7) located in container (3) above cast iron bath (2) is confined in a sealed manner;
- in a second stage, the confined atmosphere is placed under a partial vacuum which can be varied in a controlled manner so that it can be adjusted constantly to a predetermined value as a function of the evolution over time of the saturating vapor pressure of the zinc in solution in the cast iron at the temperature of the bath, said predetermined value being at least slightly higher than said saturating vapor pressure; and
- said zinc is trapped.

2. Process according to claim 1 wherein, in order to create a partial vacuum:

- the gaseous fluid which forms the confined atmosphere is extracted in a controlled manner so as to lower the pressure of the confined atmosphere progressively during a predetermined period of time to a value which is also predetermined but which is higher than the saturating vapor pressure of the zinc in solution in the cast iron at the temperature of the bath, then;
- said pressure is held for a predetermined period of time.

3. Process according to claim 1 wherein, when the zinc is trapped far from the upper surface of the bath, the zinc vapors are prevented from condensing above the bath and then falling back into said fluid.

4. Process according to claim 3 wherein, in order to prevent the zinc vapors from condensing above the bath, they are extracted from the confined atmosphere above said bath, in suspension in the gaseous fluid which forms said atmosphere, and while said gaseous fluid is being transported, it is reheated to prevent the zinc vapors from condensing.

5. Process according to claim 1 wherein, in order to trap the zinc, the gaseous fluid extracted from the container is treated far away from the bath to condense the zinc vapors contained therein.

6. Process according to claim 1 wherein, while the gaseous fluid which forms the confined atmosphere is being extracted, a gaseous oxidizing fluid is injected into the container substantially at right angles with the surface of the cast iron bath, to cause the zinc vapors issuing from said bath to oxidize.

* * * * *

UNITED STATES PATENT AND TRADEMARK OFFICE
CERTIFICATE OF CORRECTION

PATENT NO. :    5,387,275
DATED      :    February 7, 1995
INVENTOR(S) :   Jean C. TISSIER, ET AL It is certified that error appears in the above-identified patent and that said Letters Patent is hereby corrected as shown below:

On the title page, in column 2, please correct the spelling of the first-listed name following "Attorney, Agent, or Firm" to read as follows:    -- Kerkam --.

On the title page, in column 2, line 7 of the Abstract: delete "east" and insert -- cast --.

Signed and Sealed this

Fourth Day of April, 1995

Attest:

BRUCE LEHMAN

*Attesting Officer*     Commissioner of Patents and Trademarks